May 31, 1927.

G. A. ENGLUND 1,630,259

CHUCK

Filed Aug. 27, 1925

INVENTOR
Gustaf A. Englund
Harry R. Williams
att,

Patented May 31, 1927.

1,630,259

UNITED STATES PATENT OFFICE.

GUSTAF A. ENGLUND, OF WEST HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

Application filed August 27, 1925. Serial No. 52,819.

This invention relates to the class of chucks which are more particularly designed for use in connection with grinders, milling machines and the like where accurate work is required.

The object of the invention is to provide a combination of elements which results in a quick acting chuck of wide range that will hold long rods or short pieces of work of various diameters and that has no overhang, that is, has the jaws firmly supported about their holding ends. Such a chuck is capable of use in place of the more expensive collet chucks which require a number of collets for holding different diameters of work.

Figure 1:
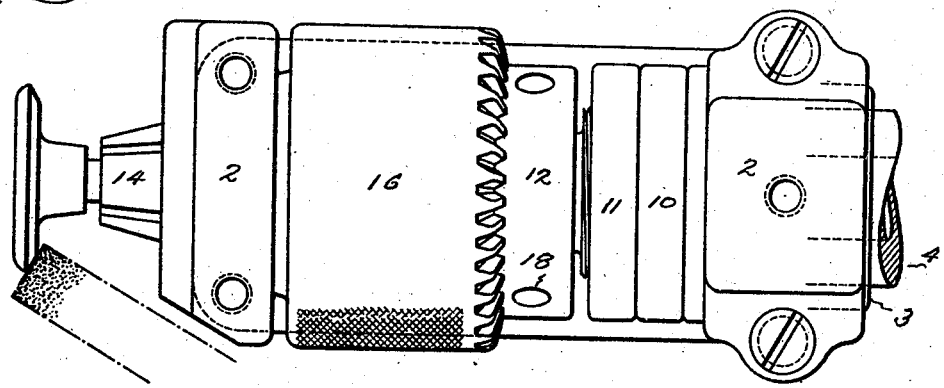
Figure 2:
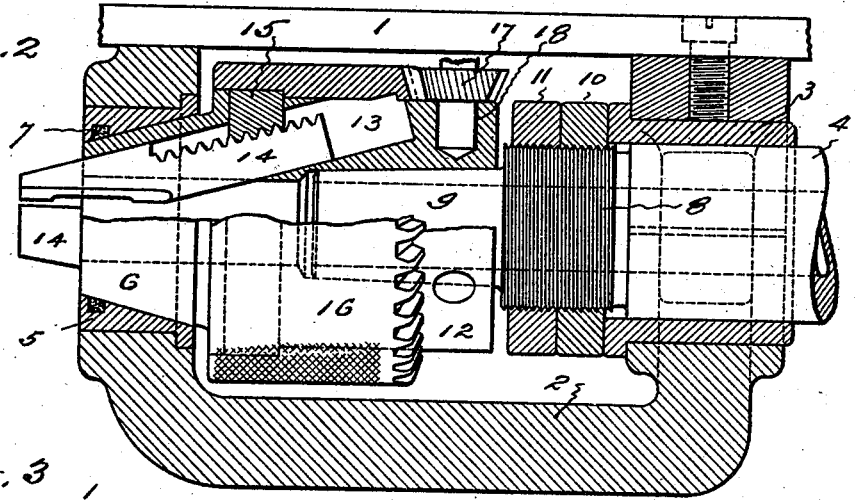
Figures 3, 4:
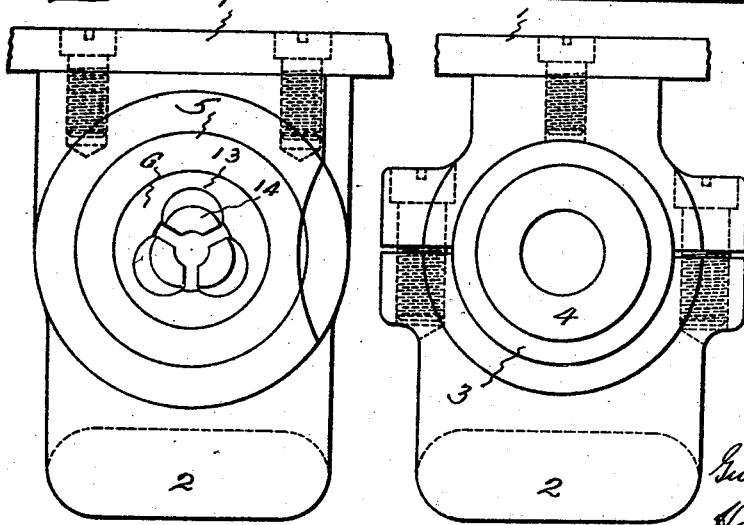

In the accompanying drawings Fig. 1 shows a plan of the device with the base plate removed. Fig. 2 shows a horizontal section. Fig. 3 is a view looking at the jaw end. Fig. 4 is a view looking toward the shank end of the structure.

The plate 1 which is illustrated may be a motor base or other part of a milling, grinding or similar machine with which the chuck is to be used. Attached to the base plate is a yoke-shaped frame 2, the limbs of which have aligned perforations. In one perforation there is a bushing 3 with a cylindrical bearing for supporting the driving spindle 4, and in the other perforation is a bushing 5 with a tapering bearing for supporting the conical chuck nose 6. The bushing 5 may have a packing ring 7 to prevent the entrance of dust between the chuck nose and its bearing.

The spindle is tubular and it may be driven by any suitable means. The spindle has an exteriorly threaded section 8 in front of the bushing 3 and a tapering section 9 in front of the threaded section. Nuts 10 and 11 are turned on the threaded section for adjusting and retaining the spindle in such position that the nose of the chuck will closely fit but freely turn in the bushing 5. The chuck body 12 has a tapering opening that fits upon the tapering end of the spindle. When it is desired to remove the spindle from the chuck body the nuts may be turned out so as to force the spindle from the chuck body.

In the body are three longitudinally extending and forwardly converging bores 13, and movable back and forth in these bores are the holding jaws 14. The backs of the jaws are provided with segmental threads engaging with which is the internal thread in the ring 15 that is located in an annular groove around the body so as it may be rotated but not moved axially of the chuck. Rotatably fitted upon the body is a sleeve 16 that is tightly connected with the ring 15. The rear edge of the sleeve has gear teeth that are adapted to be engaged by the pinion teeth of a key 17 which is applied to the body, when it is desired to open or close the jaws, with its stem inserted into one of the radial sockets 18 in the body near the rear end. Upon turning the sleeve, either by the key if such is used, or by hand if there is no key, the ring is rotated and the jaws moved forward and inward or backward and outward according to the direction the sleeve is turned, in the well known way.

With the present structure the teeth are at the rear edge of the sleeve and the operating key is applied at the back end of the body. This enables the tapering nose to be used as one of the journals for the chuck and allows the bearing to be brought close in to the end of the chuck body where it forms a firm support about the work holding jaws. A chuck designed and supported as herein described is capable of accurately holding short pieces or long rods of work of widely varying diameter so that they may be ground or turned to exact desired dimensions.

The invention claimed is:

1. A chucking means comprising a frame having axially aligned bores, a bushing with a cylindrical opening located in one bore, a bushing with a tapering opening located in the other bore, a spindle rotatably fitted in the former bushing, a chuck body removably connected with the spindle, said body having a tapering nose rotatably fitted in the tapering bushing, jaws movable in the body, means located on the chuck body between said bushings for opening and closing said jaws, and means on the spindle adjacent to the spindle-supporting bushing and adapted to engage said bushing for adjusting the position of said tapering nose in the tapering bushing.

2. A chucking means comprising a frame having axially aligned bores, a bushing with a cylindrical opening located in one bore, a bushing with a tapering opening located in the other bore, a spindle rotatably fitted in the former bushing, a chuck body removably connected with the spindle, said body having a tapering nose rotatably fitted in the latter bushing, jaws movable in the body, means located between said bushings for opening and closing said jaws, and nuts located on the spindle adjacent to the spindle supporting bushing, one of said nuts being adapted to engage the spindle-supporting bushing for adjusting the position of said tapering nose in the tapering bushing and the other of said nuts being adapted to engage the body for separating the body and the spindle.

3. A chucking means comprising a frame having axially aligned bores, a bushing with a cylindrical opening located in one bore, a bushing with a tapering opening located in the other bore, a packing ring around the interior of said tapering bushing, a spindle rotatably fitted in the former bushing, a chuck body removably connected with the spindle, said body having a tapering nose rotatably fitted in the latter bushing, jaws movable in the body, means located between said bushings for opening and closing said jaws, and means located on the spindle adjacent to the spindle-supporting bushing and adapted to engage said bushing for adjusting the position of said tapering nose in the tapering bushing and means to engage the body for separating the body and the spindle.

GUSTAF A. ENGLUND.